Patented Sept. 10, 1940

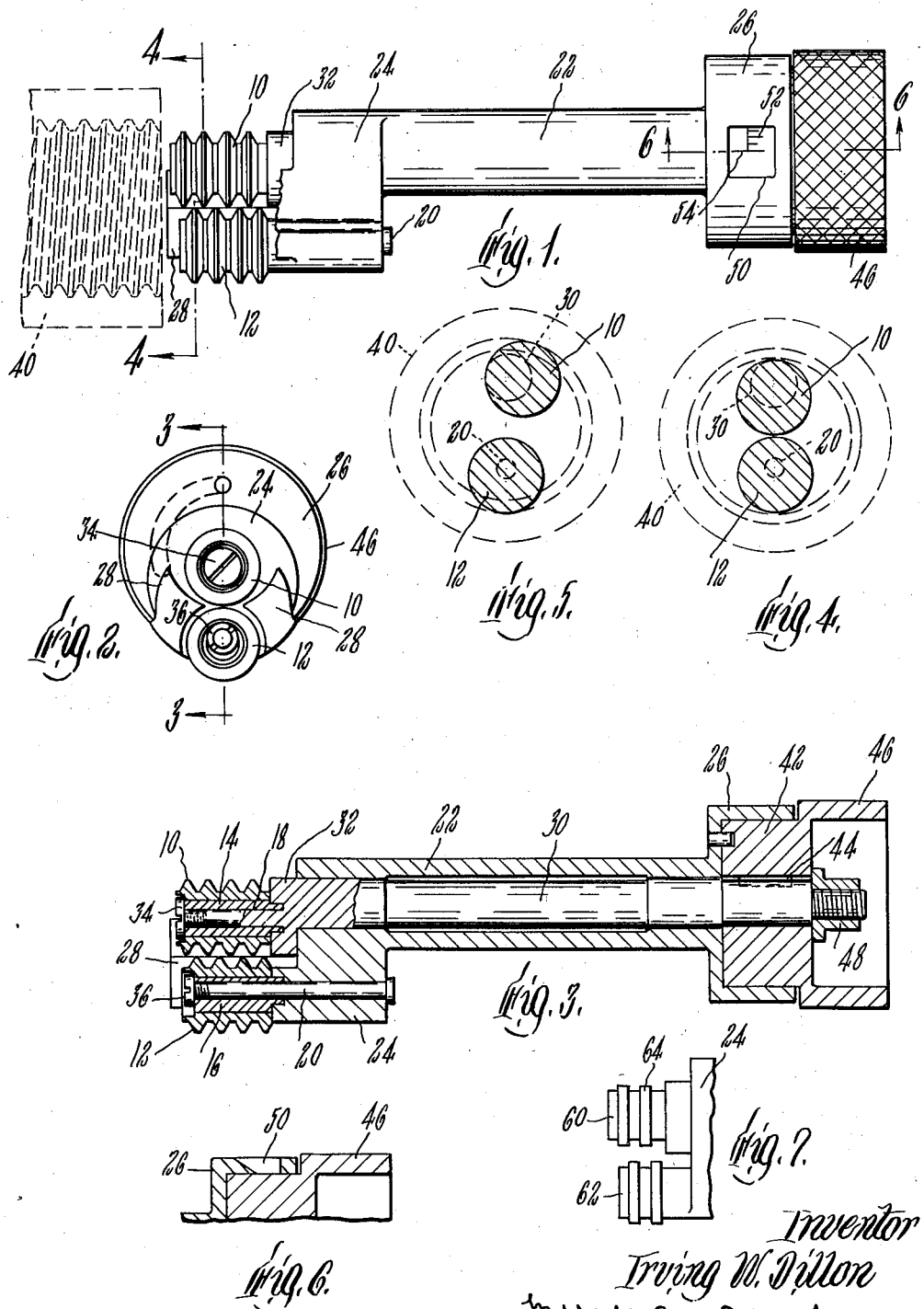

2,214,633

UNITED STATES PATENT OFFICE 2,214,633

INTERNAL SCREW-THREAD GAUGE

Irving W. Dillon, Melrose, Mass.

Application May 9, 1939, Serial No. 272,579

4 Claims. (Cl. 33—199)

This invention relates to internal screw thread gauges. It is an object of the invention to provide an improved gauge which can be inserted without rotation into a threaded bore, and then manipulated to move a plurality of gauging element into firm contact with the thread so as to detect therein inaccuracies exceeding a prescribed tolerance. It is a further object of the invention to provide a gauge which is not only rapid in use but which has a high degree of accuracy, has excellent wearing qualities, and will stand comparatively rough usage without losing its accuracy.

According to the invention, a pair of gauging elements are mounted on a carrier in such a manner that they can be moved toward each other to permit insertion into a threaded bore, without rotation of the gauge, and away from each other for gauging contact with the thread.

For a more complete understanding of the invention, reference may be had to the following description thereof, and to the drawing of which Figure 1 is an elevational view of a gauge embodying the invention.

Figure 2 is an end elevation of the same.

Figure 3 is a section on the line 3—3 of Figure 2.

Figure 4 is a section on the line 4—4 of Figure 1.

Figure 5 is a sectional view similar to Figure 4, showing the gauging elements in a different relative position.

Figure 6 is a fragmentary sectional view on the line 6—6 of Figure 1.

Figure 7 is a fragmentary elevation of a modified form of gauging elements.

The gauge comprises essentially a pair of cylindrical gauging elements 10 and 12 which are rotatably mounted respectively on a pair of sleeves 14 and 16, the sleeves being mounted on respective spindles 18 and 20. These spindles have parallel axes and are mounted on a suitable carrier which, as shown in Figures 1 and 3, may comprise an elongated shank portion 22 having a head 24 at one end and a handle portion 26 at the other end. The head 24 is preferably provided with a pair of projecting portions 28 which are parallel and adjacent to the elements 10 and 12 and serve as guide members when the gauge is introduced into a bore. The carrier has a longitudinal bore in which is journaled a shaft 30. The spindle 18 is an integral extension of or is secured in an end of the shaft 30 so that its axis is parallel to that of the shaft but is offset therefrom, the axis of the shaft being considerably nearer to the axis of the element 10 than to that of the element 12. Thus, when the shaft 30 is rotated, the distance between the spindles 18 and 20, and hence between the gauging elements 10 and 12, is increased or decreased. For this purpose, the end of the shaft 30 is provided with an elongated portion 32 eccentrically arranged with respect to the shaft 30, the sleeve 14 being tightly clamped against the enlarged portion 32 by a nut 34 on the spindle 18.

The spindle 20 projects from the head portion 24 of the carrier to support the sleeve 16, the latter being firmly held in place thereon by a suitable nut 36. Since the sleeve 16 is eccentric with respect to the spindle 20, the gauging element 12 may be adjusted toward or from the element 10 and may be fixed in any adjusted position by setting up on the nut 36.

Each of the gauging elements 10 and 12 is formed with a series of circumferential ridges and grooves, the ridges being suitably shaped to enter the grooves of an internally screw-threaded member such as is indicated at 40 in Figure 1. Since the spindle 18 is offset from the axis of the shaft 30, it is virtually a crankpin with respect to this shaft, the crank being of such dimensions as to move the gauging element 10 toward the element 12 a sufficient distance to permit the two elements to be inserted axially in the bore of the object 40 which is to be tested. The shaft 30 is then rotated to move the element 10 away from the element 12 until both elements are firmly engaged in grooves of the internal screw thread to be tested. Since both of the elements 10 and 12 are freely rotatable about their respective spindles, this relative movement between them to positions of firm engagement in the grooves of the screw thread does not involve any rubbing action between the elements and flanks of the screw thread. Hence wear on the ridges of the gearing elements is reduced to a minimum and the effective life of the gauge as a whole is prolonged. As indicated in Figures 1 and 3, the ridges of the element 10 are axially offset half a pitch from the ridges of the element 12 so that the ridges of the two elements may engage simultaneously at substantially opposite points in an internal screw thread.

Rotation of the shaft 30 relatively to the carrier in which it is journaled may be effected by any suitable means. As shown in Figure 3, an end member 42 is mounted on the end portion of the shaft 30 remote from the gauging element 10, this member being preferably keyed to the shaft by a suitable key 44 and firmly secured thereto by a nut 46. The end member is made with a reduced portion fitting into the cup-shaped handle portion of the carrier, and with a handle portion 46 which is preferably knurled to facilitate rotation of the shaft 30. The handle portion 26 of the carrier may be provided with an opening or window 50 through which a portion of the cylindrical surface of the end member 42 is visible. This visible portion of the end member is preferably provided with a series of scale marks 52 which cooperate with an index mark 54 on the handle member 26. The scale marks 52 indicate the extent of departure of the screw thread from a predetermined standard. If desired, special scale marks may be employed to indicate limits of tolerance.

In the absence of any limiting means, it is evident that the handle member 46 could be turned in either direction to move the gauging member 10 from its idle position to a thread-engaging position. As it is desirable that in practice such movements be made uniformly in the same direction so that the same portion of the scale 52 will be available in the window 50, a limiting device is preferably provided. This may be in the form of a pin 56 (Figure 3) secured to the member 26 so as to ride in an arcuate slot 58 in the end member 42. Thus the gauging movement of the element 10 can be made in one direction only.

Figure 7 illustrates a modified form of gauging element adapted for use in accurately determining errors in pitch diameter. In order to avoid errors in the determination of pitch diameter errors which might arise from lead error in the thread to be tested, the gauging elements 60 and 62 are each provided with two, or at most three, ridges 64 which, as shown, are preferably rectangular in section but which may be otherwise shaped for accurate line engagement with the thread flanks for an accurate determination of the pitch diameter.

It is evident that various modifications and changes may be made in the embodiments of the invention herein shown and described without departing from the spirit or scope thereof as defined in the following claims.

I claim:

1. An internal screw-thread gauge comprising an elongated carrier, a shaft journaled in said carrier for rotation relative thereto, a spindle mounted in said carrier parallel to said shaft, a cylindrical gauging element rotatably mounted on said spindle and eccentrically adjustable relatively to the axis thereof, a second spindle mounted on said shaft parallel to but offset from the axis thereof, a cylindrical gauging element rotatably mounted on said second spindle, both said elements having circumferential ridges shaped and spaced to enter the grooves of an internal screw thread to be tested, and means for relatively turning said carrier and shaft.

2. An internal screw-thread gauge comprising an elongated carrier having a head at one end and a handle member at the other end, a shaft journaled in said carrier, a handle member at one end of said shaft adjacent to the carrier handle member, a spindle mounted on said shaft at the other end thereof with its axis parallel to but offset from the axis of the shaft, a cylindrical gauging element rotatably mounted on said spindle, a second spindle mounted on said head with its axis parallel to and laterally spaced from that of the first said spindle, a cylindrical sleeve eccentrically and adjustably fixed on said spindle, and a cylindrical gauging element rotatably mounted on said sleeve, said elements each having a series of circumferential ridges shaped and spaced to enter the grooves of internal screw threads to be tested.

3. An internal screw-thread gauge comprising a support, a cylindrical gauging element mounted on a fixed axis on said support and formed with a series of circumferential ridges and grooves shaped to enter the grooves of an internally screw-threaded member to be tested, a second cylindrical gauging element with circumferential ridges and grooves shaped to enter the grooves of an internally screw-threaded member to be tested movably mounted on said support but constantly parallel to the first said gauging element, and means for moving said second gauging element about an axis of rotation which is spaced from the cylindrical axis of the second gauging element but is substantially nearer thereto than to the cylindrical axis of the first element.

4. An internal screw-thread gauge comprising a support, and a pair of gauging elements mounted on said support and having surfaces with circumferential ridges and grooves adapted for gauging contact with an internal screw thread, one of said elements being stationary with respect to said support, the other said element being movable about an axis to vary the distance between the thread-engaging surfaces of said elements, said axis being substantially nearer to the thread-engaging surfaces of the movable element than to those of the stationary element.

IRVING W. DILLON.